(12) United States Patent
Pjanic et al.

(10) Patent No.: US 12,255,708 B2
(45) Date of Patent: Mar. 18, 2025

(54) TRANSMISSION OF MU-MIMO SIGNALS

(71) Applicant: Telefonaktiebolaget LM Ericsson (publ), Stockholm (SE)

(72) Inventors: Dino Pjanic, Malmö (SE); Andres Reial, Höllviken (SE); Harsh Tataria, Wellington (NZ); Fredrik Tufvesson, Lund (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 6 days.

(21) Appl. No.: 18/554,073

(22) PCT Filed: Apr. 7, 2021

(86) PCT No.: PCT/EP2021/059058
§ 371 (c)(1),
(2) Date: Oct. 5, 2023

(87) PCT Pub. No.: WO2022/214169
PCT Pub. Date: Oct. 13, 2022

(65) Prior Publication Data
US 2024/0204830 A1  Jun. 20, 2024

(51) Int. Cl.
*H04B 7/0452*  (2017.01)
*H04L 25/03*  (2006.01)

(52) U.S. Cl.
CPC ..... *H04B 7/0452* (2013.01); *H04L 25/03891* (2013.01)

(58) Field of Classification Search
CPC ............. H04B 7/0452; H04L 25/03891
See application file for complete search history.

(56) References Cited

U.S. PATENT DOCUMENTS

| | | | | |
|---|---|---|---|---|
| 10,064,217 | B2* | 8/2018 | Rajagopal | H04B 7/0626 |
| 2017/0135085 | A1* | 5/2017 | Kaushik | H04B 7/0417 |
| 2018/0070345 | A1 | 3/2018 | Kaushik | |

OTHER PUBLICATIONS

International Search Report and Written Opinion dated Jan. 10, 2022 for International Application No. PCT/EP2021/059058 filed Apr. 7, 2021, consisting of 10-pages.

(Continued)

*Primary Examiner* — Vineeta S Panwalkar
(74) *Attorney, Agent, or Firm* — Weisberg I.P. Law, P.A.

(57) ABSTRACT

There is provided mechanisms for transmission of MU-MIMO signals. A method is performed by a network node. The method includes obtaining parameter values of statistics of co-scheduled user equipment served by the network node. The statistics at least pertains to mobility of each of the user equipment. The method includes dynamically selecting a multi-user transmission configuration from candidate multi-user transmission configurations. Each candidate multi-user transmission configuration specifies at least a digital pre-coding mode selected from candidate digital precoding modes and an analog beam steering mode selected from candidate analog beam steering modes. The multi-user transmission configuration is selected according to the parameter values and a configured mapping of the parameter values to the candidate multi-user transmission configurations. The method includes transmitting the MU-MIMO signals towards the user equipment using the selected multi-user transmission configuration.

20 Claims, 6 Drawing Sheets

(56) References Cited

OTHER PUBLICATIONS

F. Sohrabi et al.; "Hybrid Digital and analog Beamforming Design for Large Antenna Arrays," arXiv; Jan. 25, 2016, consisting of 13-pages.
J. Choi et al.; "User Scheduling for Millimeter Wave Hybrid Beamforming Systems with Low-Resolution ADCs," arXiv; Feb. 15, 2019, consisting of 31-pages.
L. Liang et al.; "Low-Complexity Hybrid Precoding in Massive Multiuser MIMO Systems," arXiv; Oct. 15, 2014, consisting of 10-pages.
O. El Ayach et al.; "Spatially Sparse Precoding in Millimeter Wave MIMO Systems," arXiv; May 11, 2013, consisting of 30-pages.
S. Sun; "Analytical framework of Hybrid Beamforming in Multi-Cell Millimeter-Wave Systems," IEEE Transactions on Wireless Communications, vol. 17, No. 11; Sep. 13, 2018, consisting of 15-pages.
S. Sun et al.; Propagation models and performance evaluation for 5G millimeter-wave bands, IEEE Transactions on Vehicular Technology, vol. 67, No. 9; Sep. 2018, consisting of 18-pages.
X. Gao et al.; Linear pre-coding performance in measured very-large MIMO channels, 2011 IEEE Vehicular Technology Conference (VTC-Fall), May 2011, consisting of 5-pages.
Z. Li et al.; "Optimizing Channel-Statistics-Based Analog Beamforming for Millimeter-Wave Multi-User Massive MIMO Downlink," IEEE Transactions on Wireless Communications, vol. 16, No. 7; Jul. 2017, consisting of 15-pages.
K. Aldubaikhy et al.; Low-Complexity User Selection Algorithms for Multiuser Transmissions in mmWave WLANS; IEEE Transactions on Wireless Communications, vol. 19, No. 4; Apr. 2020, consisting of 14-pages.

\* cited by examiner

TRANSMISSION OF MU-MIMO SIGNALS

CROSS-REFERENCE TO RELATED APPLICATION

This application is a Submission Under 35 U.S.C. § 371 for U.S. National Stage Patent Application of International Application Number: PCT/EP2021/059058, filed Apr. 7, 2021 entitled "TRANSMISSION OF MU-MIMO SIGNALS," the entirety of which is incorporated herein by reference.

TECHNICAL FIELD

Embodiments presented herein relate to a method, a network node, a computer program, and a computer program product for transmission of multi-user multiple input multiple output (MU-MIMO) signals.

BACKGROUND

The introduction of millimeter-wave (mmW) carrier frequencies has enabled beamforming with large antenna arrays (also known as massive MIMO) to increase the link budget. By virtue of amplitude and phase control of the transmitted signals, beamforming as performed at the transmission and reception point (TRP) at the network-side ensures that the desired energy is steered towards the direction of the desired user equipment (UE) at the user-side, whilst the undesired energy (for interfering UEs) is suppressed or even nulled. To establish and maintain the highest spectral efficiency at each UE, it is desirable to continuously adapt the desired beams towards the direction of served UEs. This is of particular significance when mobility in the system is present, because of movements by either the UEs or the multipath environment (scatterers movements). Due to the short wavelengths at mmW cater frequencies, given moderate levels of Doppler spread (hundreds of Hz), the time scale on which the beam updates need to take place is on the order of milliseconds to microseconds. This puts stringent requirements on the design of suitable beamforming architectures which can be used to support multiuser functionality. To this end, the processing facilitating the beam generation and steering needs to be low-complexity.

To enable the highest flexibility and performance, beamforming to multiple UEs should be performed in the digital signal processing domain with the amplitude and phase control from baseband processing algorithms. Such an approach not only enables simultaneous formation of large number of beams, but also enables as precise steering (amplitude and phase control) of the formed beams. Nonetheless, this requires the introduction of an active antenna system (AAS) at each element, where the element backplane is interfaced with an up/down-conversion radio frequency (RF) chain communicating with the baseband control unit. At mmW frequencies, equipping each antenna element of a massive MIMO antenna array, i.e. each AAS, with its own analog to digital converter (ADC), digital to analog converter (DAC) and baseband port connection is both energy consuming and cost prohibitive, due to the exploding power consumption and interconnect complexity of mixed-signal circuits in the RF chains. This makes the use of fully digital beamforming complex at mmW frequencies.

This has resulted in the proposal of hybrid beamforming, according to which a substantial portion of the transceiver processing is transferred from the baseband control unit (in the digital signal processing domain) to the RF front-end (in the analog signal processing domain). Via the use of power dividing, phase shifting and power combining circuits close to the RF front-end, a high dimensional analog beamforming matrix is created, which alleviates processing load from the baseband control unit. With low-dimensional digital beamforming at baseband, a significant reduction in the number of up/down-conversion chains at the TRP can be achieved. The inherent structure of the hybrid beamformer compliments the sparse speculated structure of the mmW physical radio propagation channel, where only a small number of RF chains can be used to focus energy into the dominant directions of the physical radio propagation channel. Here, each antenna forms part of a joint hybrid beamformer, which has a much reduced number of ADCs/DACs and baseband port connections relative to the total number of antenna elements.

Beamforming towards multiple UEs can thus be conducted purely in the digital signal processing domain (hereinafter referred to as digital beamforming, or digital precoding), purely in the analog signal processing domain (hereinafter referred to as analog beamforming, or analog beam steering), or in a combination of the in the digital signal processing domain and the analog signal processing domain (referred to as hybrid beamforming). For digital beamforming, each antenna has a dedicated RF signal and path with per-element amplitude and phase control at baseband. Due to this, the high-power consumption of the local oscillator distribution circuits, data converters, and the digital baseband processor makes it difficult to implement for high element count antenna arrays. In contrast, analog beamforming can support a large number of antenna elements in a power efficient manner, but are limited in terms of algorithmic flexibility, since only a single beam can be formed and steered around a single central angle of departure (AOD). Aiming to strike the right balance between these two extremes, hybrid beamforming breaks this deadlock by performing the bulk of the spatial signal processing at the RF front-end and using a minimal number of RF down-conversion chains to realize additional spatio-temporal processing in the digital signal processing domain. Due to its design, the number of data streams supported by the hybrid beamforming system is upper bounded by the number of down-conversion chains.

However, although hybrid beamforming provides a good compromise between analog beamforming and digital beamforming there might be scenarios where traditional hybrid beamforming techniques are inadequate to obtain optimum network performance.

SUMMARY

An object of embodiments herein is to address the above issues by provide techniques for transmission of MU-MIMO signals using a dynamically selected multi-user transmission configuration.

According to a first aspect there is presented a method for transmission of MU-MIMO signals. The method is performed by a network node. The method comprises obtaining parameter values of statistics of co-scheduled user equipment served by the network node. The statistics at least pertains to mobility of each of the user equipment. The method comprises dynamically selecting a multi-user transmission configuration from candidate multi-user transmission configurations. Each candidate multi-user transmission configuration specifies at least a digital precoding mode selected from candidate digital precoding modes and an analog beam steering mode selected from candidate analog beam steering modes. The multi-user transmission configuration is selected according to the parameter values and a configured mapping of the parameter values to the candidate multi-user transmission configurations. The method comprises transmitting the MU-MIMO signals towards the user equipment using the selected multi-user transmission configuration.

According to a second aspect there is presented a network node for transmission of MU-MIMO signals. The network node comprises processing circuitry. The processing circuitry is configured to cause the network node to obtain parameter values of statistics of co-scheduled user equipment served by the network node. The statistics at least pertains to mobility of each of the user equipment. The processing circuitry is configured to cause the network node to dynamically select a multi-user transmission configuration from candidate multi-user transmission configurations. Each candidate multi-user transmission configuration specifies at least a digital precoding mode selected from candidate digital precoding modes and an analog beam steering mode selected from candidate analog beam steering modes. The multi-user transmission configuration is selected according to the parameter values and a configured mapping of the parameter values to the candidate multi-user transmission configurations. The processing circuitry is configured to cause the network node to transmit the MU-MIMO signals towards the user equipment using the selected multi-user transmission configuration.

According to a third aspect there is presented a network node for transmission of MU-MIMO signals. The network node comprises an obtain module configured to obtain parameter values of statistics of co-scheduled user equipment served by the network node. The statistics at least pertains to mobility of each of the user equipment. The network node comprises a select module configured to dynamically select a multi-user transmission configuration from candidate multi-user transmission configurations. Each candidate multi-user transmission configuration specifies at least a digital precoding mode selected from candidate digital precoding modes and an analog beam steering mode selected from candidate analog beam steering modes. The multi-user transmission configuration is selected according to the parameter values and a configured mapping of the parameter values to the candidate multi-user transmission configurations. The network node comprises a transmit module configured to transmit the MU-MIMO signals towards the user equipment using the selected multi-user transmission configuration.

According to a fourth aspect there is presented a computer program for transmission of MU-MIMO signals, the computer program comprising computer program code which, when run on a network node, causes the network node to perform a method according to the first aspect.

According to a fifth aspect there is presented a computer program product comprising a computer program according to the fourth aspect and a computer readable storage medium on which the computer program is stored. The computer readable storage medium could be a non-transitory computer readable storage medium.

Advantageously these aspects can be used to provide hybrid beamforming with optimum network performance.

In conventional hybrid beamforming systems, the precoding and scheduling approach is typically fixed, and it is not feasible to switch dynamically between different beamforming modes. The herein disclosed aspects enable a dynamic selection between different hybrid beamforming modes, depending, for example, on properties such as user equipment mobility, but also optionally based on other factors, parameters, and conditions. The best multi-user transmission configuration can thereby be selected for each multiuser scenario to yield optimal spectral efficiency performance.

Advantageously, the adaptive selection of digital precoding mode and analog beam steering mode can be combined with adaptive selection of multiuser scheduling mode, enabling co-design of beamforming and scheduling.

Advantageously, the above aspects improve the digital processing and fronthaul reduction versus potential performance loss trade-off for hybrid beamforming architectures with typically radio conditions at mmWave frequencies.

Advantageously, the above aspects can significantly enhance performance (e.g., user equipment SINR, spectral efficiency, and cell throughput, for a given level of processing complexity in the network node), improving network resource utilization and user experience, relative to the case where a fixed beamforming mode is deployed at any given site, irrespective of the network configuration, load and mobility levels.

Advantageously, the above aspects enable the processing complexity to be lowered while maintaining desired performance, lowering network equipment cost and power consumption via the transfer of a large amount of digital processing into the analog signal processing domain.

Advantageously, the above aspects are applicable to clustered scenarios such as user equipment located in dense urban downtown centers, in variety of indoor environments (shopping malls, airports, cafes and offices), as well as to public transportation scenarios.

Advantageously, the above aspects can provide insights and guidelines for network deployments at an early stage, by optimizing radio access components of the network, e.g., selecting most appropriate network equipment deployed for a given, or expected, distribution of user equipment at a particular site or area.

Other objectives, features and advantages of the enclosed embodiments will be apparent from the following detailed disclosure, from the attached dependent claims as well as from the drawings.

Generally, all terms used in the claims are to be interpreted according to their ordinary meaning in the technical field, unless explicitly defined otherwise herein. All references to "a/an/the element, apparatus, component, means, module, step, etc." are to be interpreted openly as referring to at least one instance of the element, apparatus, component, means, module, step, etc., unless explicitly stated otherwise. The steps of any method disclosed herein do not have to be performed in the exact order disclosed, unless explicitly stated.

BRIEF DESCRIPTION OF THE DRAWINGS

The inventive concept is now described, by way of example, with reference to the accompanying drawings, in which.

DETAILED DESCRIPTION

The inventive concept will now be described more fully hereinafter with reference to the accompanying drawings, in which certain embodiments of the inventive concept are shown. This inventive concept may, however, be embodied in many different forms and should not be construed as limited to the embodiments set forth herein; rather, these embodiments are provided by way of example so that this disclosure will be thorough and complete, and will fully convey the scope of the inventive concept to those skilled in the art. Like numbers refer to like elements throughout the description. Any step or feature illustrated by dashed lines should be regarded as optional.

Figure 1:
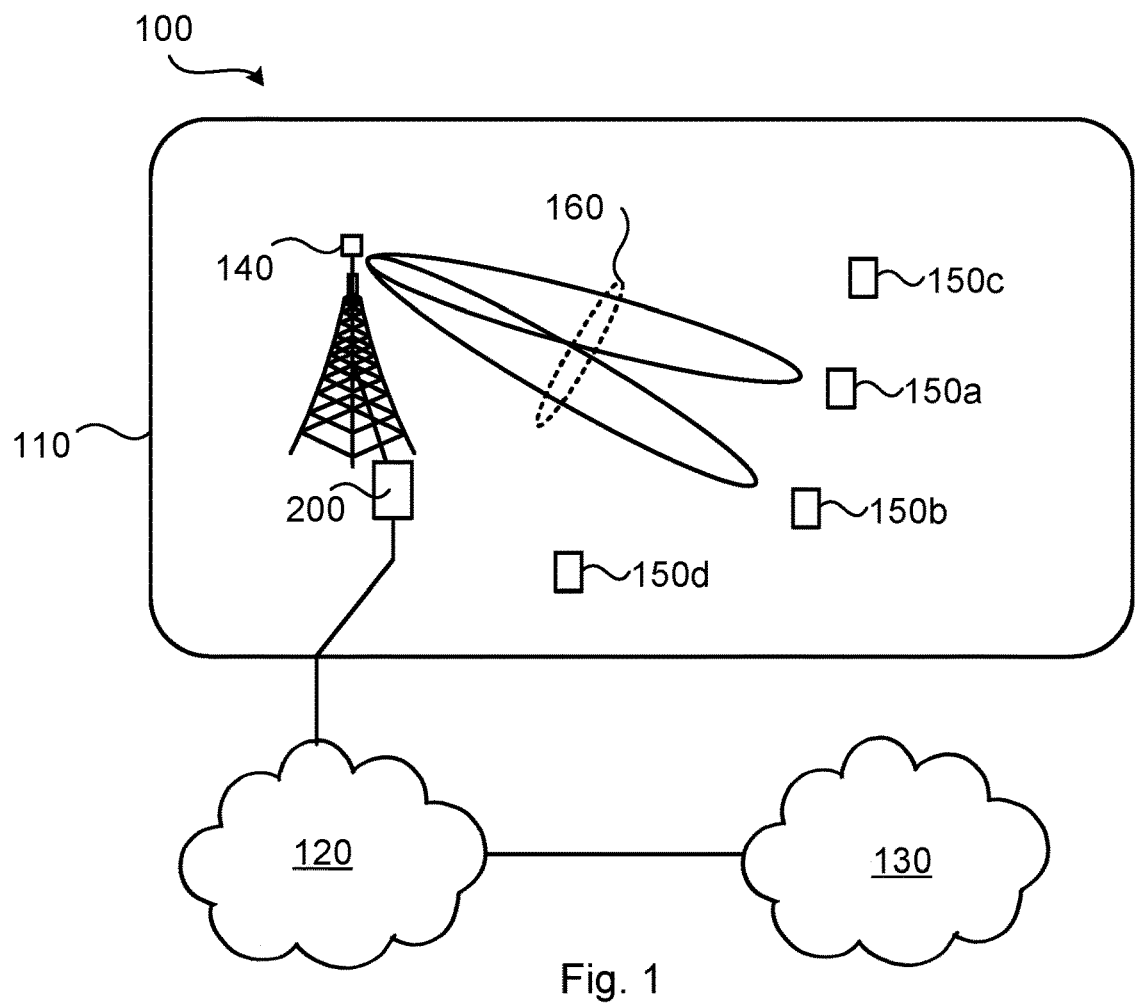
FIG. 1 and FIG. 2 are schematic diagrams illustrating a communication network according to embodiments.

FIG. 1 is a schematic diagram illustrating a communication network 100 where embodiments presented herein can be applied. The communication network 100 could be a third generation (3G) telecommunications network, a fourth generation (4G) telecommunications network, a fifth generation (5G) telecommunications network, or any evolvement thereof, and support any 3GPP, IEEE, or other telecommunications standard, where applicable.

The communication network 100 comprises a network node 200 configured to provide network access to user equipment, as represented by UEs 150a, 150b, 150c, 150d, in a radio access network 110. The radio access network 110 is operatively connected to a core network 120. The core network 120 is in turn operatively connected to a service network 130, such as the Internet. The UEs 150a: 150d are thereby enabled to, via the network node 200, access services of, and exchange data with, the service network 130.

The network node 200 comprises, is collocated with, is integrated with, or is in operational communications with, a transmission and reception point (TRP) 140. The network node 200 (via its TRP 140) and the user equipment UEs 150a:150d are configured to communicate with each other in directional beams, as illustrated at reference numeral 160. In this respect, directional beams that could be used both as transmission beams and reception beams will hereinafter simply be referred to as directional beams, or just beams. The network node 200 is equipped with a hybrid beamformer which enables the formation of the beams 160 to each UE 150a, 150b, 150c, 150d.

Examples of network nodes 200 are radio access network nodes, radio base stations, base transceiver stations, Node Bs, evolved Node Bs (eNBs), gNBs, access points, access nodes, and backhaul nodes. Examples of UEs 150a: 150d are wireless devices, mobile stations, mobile phones, handsets, wireless local loop phones, smartphones, laptop computers, tablet computers, network equipped sensors, network equipped vehicles, and so-called Internet of Things (IoT) devices.

As noted above there might be scenarios where traditional hybrid beamforming techniques are inadequate to obtain optimum network performance.

In further detail, previous efforts to understand and characterize the optimal spectral and energy efficiency performance of hybrid beamforming in multiuser scenarios assumes static scenarios, where mobility of either the UEs 150a: 150d or in the physical radio propagation channel (as a result of scatterer movements) is not considered. This has an impact on the inter-UE channel correlation levels since spatial consistency across large-scale and small-scale propagation parameters is modelled. This in turn impacts the resulting spectral efficiency performance, as multiuser interference may remain unsuppressed for the known techniques of hybrid beamforming.

It is hereinafter assumed that at least UEs 150a, 150b are to be co-scheduled.

Previous hybrid beamforming algorithms also do not cater to closely located UEs 150a, 150b where the angular separation across multiple UEs 150a, 150b is relatively small in comparison. Under such scenarios, most of the previously proposed hybrid beamforming algorithms yield sub-optimal results for various combinations of analog and digital beamforming techniques.

For spectrally efficient operation, the choice of beamforming (e.g. striking the right balance power maximization or interference nullification), and scheduling strategy (e.g. selection of UEs 150a, 150b to prioritize and co-schedule) have a major impact on performance, e.g. per-UE Signal-to-Interference-and-Noise Ratio (SINR), spectral efficiency and resulting cell throughput.

Previous hybrid beamforming techniques do not allow for a low-complexity approach to configure a suitable beamforming algorithm at the network side, given the state of propagation conditions, in the presence of mobility of the UEs 150a, 150b and spatial distribution of the UEs 150a, 150b. The coupling between this and the performance of UE scheduling mechanisms commonly deployed in network nodes at the network-side are also uncharacterized.

There is thus a need to address performance optimization of mmW systems incorporating the influence of at least mobility and possibly also other factors, parameters, or conditions, such as multiuser scheduling, when forming multiple beams using hybrid beamforming.

The embodiments disclosed herein therefore relate to mechanisms for transmission of MU-MIMO signals. In order to obtain such mechanisms there is provided a network node 200, a method performed by the network node 200, a computer program product comprising code, for example in the form of a computer program, that when run on a network node 200, causes the network node 200 to perform the method.

Figure 2:
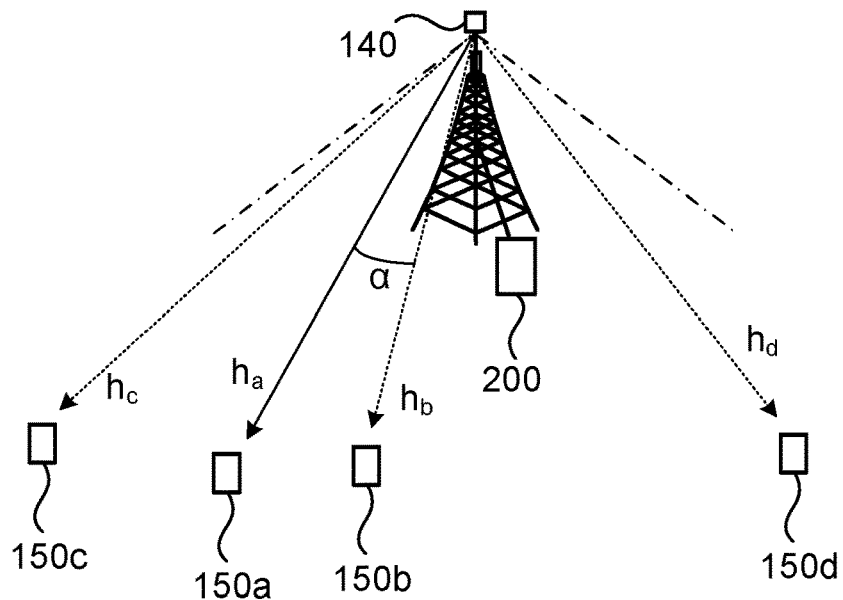

Consider the scenario illustrated in FIG. 2. FIG. 2 shows the communication network of FIG. 1 but without the radio access network 110, the core network 120 and the service network 130. The network node 200 simultaneously (over the same time-frequency resource block) serves L single antenna UE 150a, 150b, 150c, 150d geographically distributed within the 120° field-of-view of the antenna array at the TRP 140, marked by dash-dotted lines. The scatterers (not shown in FIG. 2 for clarity), in between the TRP 140 and the UE 150a, 150b, 150c, 150d can be moving, contributing to the overall Doppler spread of the physical radio propagation channel. Assume that UE 150a is the desired UE, while the other UEs 150b, 150c, 150d receive interference. The angular separation in the azimuth domain between UE 150a and UE 150b is shown as a for the sake of illustration. Each UE

150a, 150b, 150c, 150d has an associated individual estimated 1-by-M downlink physical radio propagation channel vector, h, which takes the sub-script of the UE index, from a to d in the figure and in general from 1, 2, . . . , L for L number of UEs 150a, 150b.

Aspects of digital precoding and analog beam steering will be disclosed next.

Digital precoding, also referred to as digital beamforming, refers in this disclosure to applying appropriate weights to the output signals of different baseband ports in order to control the overall radiation pattern and control the lobes (and, in some cases, nulls) of signals transmitted to each co-scheduled UE 150a, 150b. In the hybrid beamforming context, the weighted baseband port output is fed to a group of multiple antenna elements where analog beam steering is additionally applied (see below). The output signal to each port may be a sum of the signals of multiple users or a multi-feed with users separated. Some non-limiting examples of digital precoding modes will be disclosed next.

For Matched Filtering (MF), the downlink beamforming vector to each UE 150a, 150b is designed from the network node 200 by taking the Hermitian transpose of the estimated propagation channel vector from the UE 150a, 150b to the TRP 140. The focus of this technique is on received power maximization for the served UE 150a, 150b, and hence suffers from multiuser interference, particularly in the high Signal-to-Noise Ratio (SNR) regime. For massive MIMO scenarios, it has recently been shown that MF works optimally as a digital beamforming technique in the limit as the number of network node 200 antennas grows serving a fixed number of UEs 150a, 150b.

Unlike MF, the focus of Zero-Forcing (ZF) is on nullifying the present multiuser interference. This is done by computing the left-pseudo inverse of the estimated propagation channel from a given UE 150a, 150b to the TRP 140. Since this involves placing the channels of the undesired UE 150c, 150d in the null space of the channels of the desired UE 150a, 150b, interference can be nulled. The algorithm offers superior performance at high SNRs.

For Regularized ZF (RZF), a regularization factor, proportional to the link SNR is introduced to improve the low SNR sub-optimality of the ZF algorithm. By regularizing the left-pseudo inverse of the estimated propagation channel from a particular UE 150a, 150b to the TRP 140, the inverse can be better conditioned and therefore any potential rank deficiency or poor matrix conditioning which may exist in the inversion process can be removed. The algorithm converges to the same performance as MF at low SNRs and offers equivalent performance to ZF at high SNRs.

Signal-to-Leakage-plus-Noise Ratio (SLNR) focuses on maximization of the SLNR for the desired UE 150a, 150b, by transmitting on the maximum eigenvector of the left pseudo-inverse of the composite multiuser channel matrix.

Digital precoding implicitly determines the way amplitude and phase of the multiple generated/steered beams should be manipulated. Using digital signal processing algorithms at the baseband of the network node 200, the different digital precoding modes differ from each other in terms of enhancement of the signal power in the direction of the desired (scheduled) UE 150a, 150b, enhancement of the overall signal power distribution within the geographical vicinity of the desired UE 150a, 150b positions, suppression or nulling of the interference towards the direction of the desired (scheduled) UE 150a, 150b, and suppression or nulling of interference within the geographical vicinity of the desired (scheduled) UE 150a, 150b.

Analog beam steering, also referred to as analog beamforming, refers in this disclosure to applying appropriate phase shifts to groups of antenna elements constituting a baseband port, in order to achieve a directionality (spatial selectivity) for the signal transmitted from the elements, unrelated to the digital precoding applied to the baseband ports. The per-element phase shift weights are preferably constant-modulus to obtain maximal PA efficiency, for example Discrete Fourier Transform (DFT)-like coefficients or classical phased array coefficients. At each antenna element, the common baseband port output signal is multiplied with the element's respective phase shift weight. In some examples of hybrid beamforming, multiple separately controlled phase shifts are be applied to the same element group, e.g. to independently steer beams towards multiple users. Some non-limiting examples of analog beam steering modes will be disclosed next.

For Random Angle (RA) RF processing, the design of analog beamforming weights is done with a random set of angles, which are fed to the analog beamforming vectors. The angles are drawn from a uniform distribution in the azimuth and elevation domains between [−60°, 60] and [−15°, 15], respectively. These are inline with the azimuth and elevation look angles of the TRP 140.

According to Selection Combining (SC) RF processing, the strongest path for each UE 150a, 150b is selected and then the gain of the analog beams is steered towards the strongest path by appropriately designing the analog beamforming weights. The strongest path can be selected by computing the absolute value of the estimated propagation channel vector multiplied with the array steering response for a given set of azimuthal and elevation angles.

For Aggregate Composite Channel Phase Extraction (AC-CPE) RF processing the weights are generated by extracting the phases of the conjugate transpose of the composite downlink channel from the TRP 140 towards multiple UE 150a, 150b. AC-CPE provides phase-only control at each RF chain by extracting phases of the conjugate transpose of the aggregate downlink channel from the network node 200 to each UE 150a, 150b. This is to align the phases of channel elements, and thus harvest the large array gain on offer by the large number of antennas at the TRP 140.

Since analog beam steering explicitly determines the way multiple analog beams are formed, and steered, the different analog beam steering modes differ from each other in terms of the signal power which is generated and steered towards the direction of the desired (scheduled) UE 150a, 150b, as well as the overall signal power distribution within the geographical vicinity of the position of the desired (scheduled) UE 150a, 150b. In order to do this, the different analog beam steering modes generate and adapt the amplitude and the phase of the analog beams (captured in the design of the beam steering weights) using analog RF front-end circuits. The different analog beam steering modes may also differ from each other in terms of beam coherence distance, user tracking consistency, user tracking duration in multipath environment, etc.

The above disclosed different analog beam steering modes are suitable for interfacing with any of the above disclosed digital precoding modes, and vice versa.

With the assumption of $N_t$ number of up/down-conversion RF chains at the network node 200 (or TRP 140), the analog beamforming matrix (configured for power division, phase shifting and power combining) is of dimension $N_t$-by-M, and is designed to yield up to $N_t$ beams targeted towards $N_t$ discrete angles-of-departure (AODs) in the downlink. The vast majority of the analog beamformers design the needed $N_r$-by-M complex analog beamforming weights via a codebook of fixed beams, having a discrete Fourier transform (DFT) structure. The precise method to generate the DFT entries can be different and depend on the particular analog beam steering mode under consideration. Below will be provided specific examples of different analog beam steering modes. The adaptation of the analog beams take place based on long-term (second order) temporal variations of the physical radio propagation channel conditions. This is in contrast to digital precoding, where the magnitude and phase manipulation of the transmitted beams is enabled using digitally assisted signal processing on an instantaneous time basis, using currently estimated physical radio propagation channel conditions. As such, the digital beamforming matrix, having dimension M-by-$N_r$, can be designed to increase the desired signal power to the served UE 150a, 150b or assisting to steer nulls in other directions (locations) towards interfering UE 150c, 150d. A variety of methods exist to realize digital beamforming, which are focusing on optimizing the trade-off between desired signal maximization or interference nulling (since both cannot be achieved due to conflicting design requirements). Below will be provided specific examples of different digital precoding modes.

Approaches of digital precoding modes and analog beam steering modes that perform well for static and/or randomly distributed UEs 150a, 150b might offer inferior performance or unfavorable performance/complexity trade-off for moving and/or closely spaced UEs 150a, 150b, since many of the physical radio propagation channel multipath components are likely to be present over relatively large distances, which increases the inter-UE channel correlation, yielding higher interference powers. If at such times, given knowledge of the link SNRs, the network node 200 is configured make a decision about which combination of digital precoding mode and analog beam steering mode is able to provide the most optimal UE spectral efficiencies, this can improve the SINR for each user as well as the throughput and overall system performance.

Figure 3:
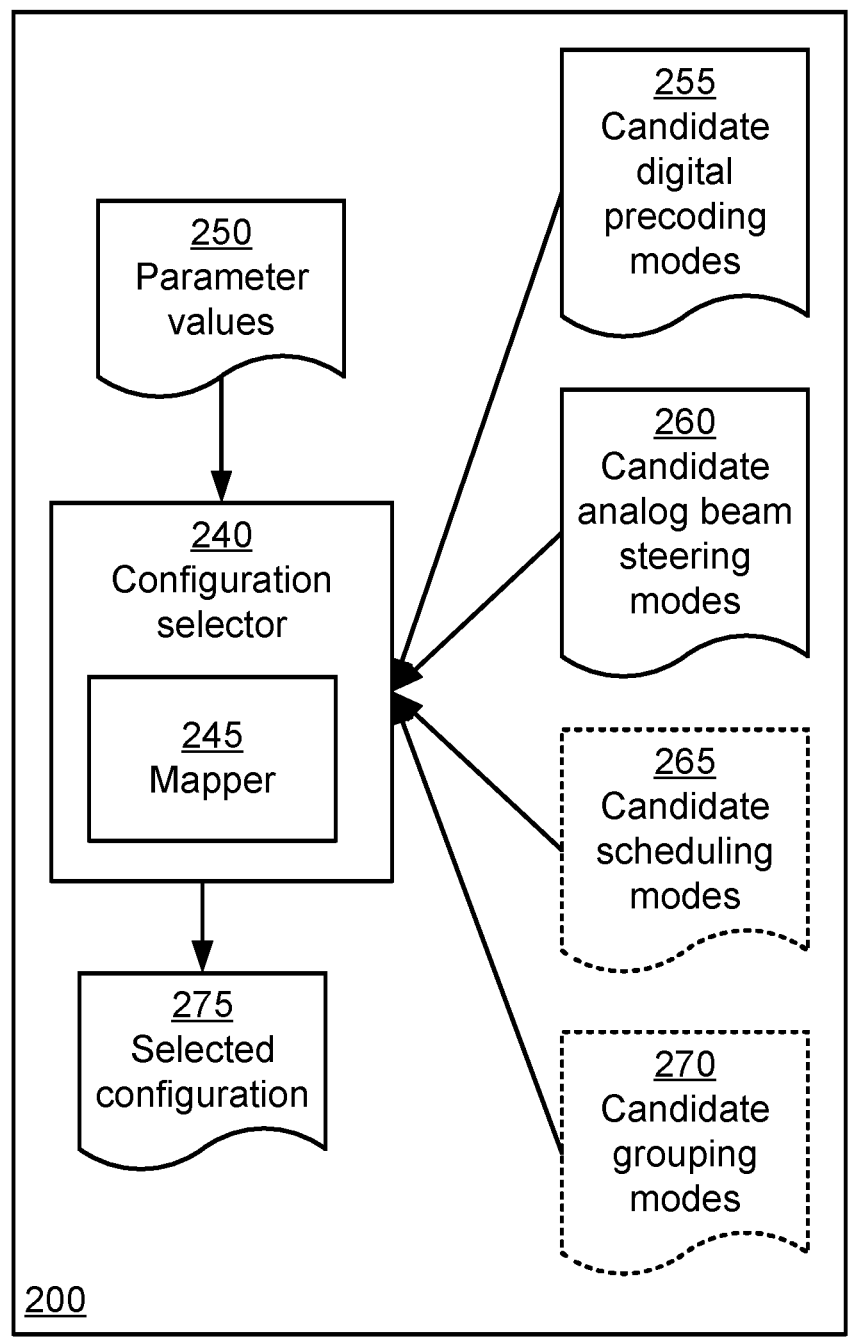
FIG. 3 is a schematic diagrams illustrating a network node according to embodiments.

FIG. 3 schematically illustrates a block diagram of a network node 200. The network node 200 is configured to be operatively connected to a TRP 140 having a massive MIMO antenna array with cross-polarized elements which are interfaced with integrated RF front-end circuit blocks. This is linked with modules 240:290 in the network node 200 configured for hybrid beamforming, and more particularly for selecting a multi-user transmission configuration specifying a combination of a digital precoding mode and an analog beam steering mode. Description of the network node 200 in FIG. 3 will be made with parallel reference to FIG. 4.

Figure 4:
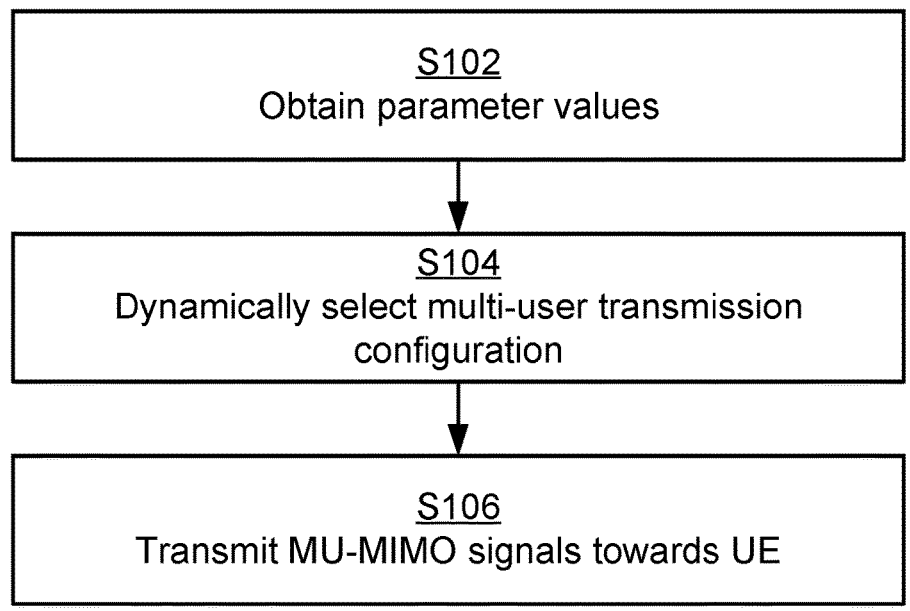
FIG. 4 is a flowchart of methods according to embodiments.

FIG. 4 is a flowchart illustrating embodiments of methods for transmission of MU-MIMO signals. The methods are performed by the network node 200. The methods are advantageously provided as computer programs 1220.

In general terms, the network node 200 adapts its hybrid beamforming mode, by means of dynamically selecting a multi-user transmission configuration from candidate multi-user transmission configurations, based on user characteristics, such as mobility of the UEs 150a, 150b. The adaptation is based on predetermined mapping rules. The user characteristics are provided as input to the mapping function, which then provides the selected multi-user transmission configuration as output. Particularly, the network node 200 is configured to perform steps S102, S104, S106:

S102: The network node 200 obtains parameter values of statistics of co-scheduled UEs 150a, 150b served by the network node 200. The statistics at least pertains to mobility of each of the UEs 150a, 150b. The parameter values can be provided at the network node 200 in a parameter values module 250.

S104: The network node 200 dynamically selects a multi-user transmission configuration from candidate multi-user transmission configurations. The selection of the multi-user transmission configuration can at the network node 200 be implemented in a configuration selector module 240. Each candidate multi-user transmission configuration specifies at least a digital precoding mode selected from candidate digital precoding modes and an analog beam steering mode selected from candidate analog beam steering modes. Parameters defining each of the candidate digital precoding modes can be provided at the network node 200 in a candidate digital precoding modes module 255. Parameters defining each of the candidate analog beam steering modes can be provided at the network node 200 in a candidate analog beam steering modes module 260. The multi-user transmission configuration is selected according to the parameter values and a configured mapping of the parameter values to the candidate multi-user transmission configurations. The preconfigured mapping can at the network node 200 be implemented in a mapper module 245. Each multi-user transmission configuration might define a hybrid beamforming mode as defined by one digital precoding mode and one analog beam steering mode.

S106: The network node 200 transmits the MU-MIMO signals towards the UEs 150a, 150b using the selected multi-user transmission configuration. The selected configuration can be provided at the network node 200 in a selected configuration module 275.

As will be further disclose below, the network node 200 might further comprise a candidate scheduling modes module 265 and/or a candidate grouping modes module 270.

Given the scenario presented in FIG. 2, a network node 200 can be configured as in FIG. 3 and in accordance with the method of FIG. 4 with multiple candidate multi-user transmission configurations, where each candidate multi-user transmission configuration specifies at least a digital precoding mode selected from candidate digital precoding modes and an analog beam steering mode.

For the selected multi-user transmission configuration, transmission of the MU-MIMO signals towards the UEs 150a, 150b can be performed using known techniques for channel sounding, user grouping, precoding weight computation, etc. The network node 200 can, for example, perform uplink sounding and estimate the uplink physical radio propagation channels from estimates for a subset of relevant beams, assuming that other beams are negligible. This is in line with the sparse nature of the mmWave channel, since most often, only a certain number of directions in the channel are prominent.

This method enables the network node 200 to optimize beamformed signal transmission and reception. The multi-user transmission configuration can be dynamically selected and tuned based on a dynamic switching mechanism, tracking the distribution of the UEs 150a, 150b, mobility status, link SNR and other operating network parameters.

In conventional hybrid beamforming systems, the precoding and scheduling approach is typically fixed, and it is not feasible to switch dynamically between different beamforming modes. The disclosed method enables a dynamic selection between different hybrid beamforming modes, depending, for example, on properties such as user equipment mobility, but also optionally based on other factors, parameters, and conditions. The best multi-user transmission configuration can thereby be selected for each multiuser scenario to yield optimal spectral efficiency performance.

Advantageously, the adaptive selection of digital precoding mode and analog beam steering mode can be combined with adaptive selection of multiuser scheduling mode, enabling co-design of beamforming and scheduling.

Advantageously, the disclosed method improves the digital processing and fronthaul reduction versus potential performance loss trade-off for hybrid beamforming architectures with typically radio conditions at mmWave frequencies.

Advantageously, the disclosed method can significantly enhance performance (e.g., user equipment SINR, spectral efficiency, and cell throughput, for a given level of processing complexity in the network node), improving network resource utilization and user experience, relative to the case where a fixed beamforming mode is deployed at any given site, irrespective of the network configuration, load and mobility levels.

Advantageously, the disclosed method enables the processing complexity to be lowered while maintaining desired performance, lowering network equipment cost and power consumption via the transfer of a large amount of digital processing into the analog signal processing domain.

Advantageously, the disclosed method is applicable to clustered scenarios such as UEs 150a, 150b located in dense urban downtown centers, in variety of indoor environments (shopping malls, airports, cafes and offices), as well as to public transportation scenarios.

Advantageously, the disclosed method can provide insights and guidelines for network deployments at an early stage, by optimizing radio access components of the network, e.g., selecting most appropriate network equipment deployed for a given, or expected, distribution of UEs 150a, 150b at a particular site or area.

Embodiments relating to further details of transmission of MU-MIMO signals as performed by the network node 200 will now be disclosed.

A new multi-user transmission configuration might be selected as the network conditions and UE population changes. Particularly, in some embodiments, the multi-user transmission configuration is dynamically selectable per each scheduling instance of the UEs 150a, 150b. The selection of multi-user transmission configuration might alternatively be made long-term, applying to a large number of subsequent scheduling instances. Updates may be performed regularly, where the update rate is determined by the frequency of changes in the network environment, e.g., seconds, minutes or hours. Alternatively, updates may be performed when changes in the network environment exceed a threshold.

In some embodiments, the mobility of the UEs 150a, 150b is defined by respective user equipment movement trajectories and mobility status of the UEs 150a, 150b.

In some embodiments, the statistics further pertain to at least one of: spatial separation between the UEs 150a, 150b, link quality for each of the UEs 150a, 150b.

The parameter values might pertain to other factors, parameters, or conditions. Particularly, in some embodiments, the parameter values also are of network operation parameters. In some non-limiting examples, the network operation parameters pertain at least to one of: current traffic load of the network node 200, currently usable number of MU-MIMO layers at the network node 200. These characteristics may be estimated using known techniques, e.g. using reported reference signal received power (RSRP) dynamics, beam switching rates in beam management, channel estimation-based based Doppler estimates for (i): channel estimate correlation, (ii): radio resource management (RRM) SINR reports or channel state information reference signal (CSI-RS) reports, (iii): number of served UEs 150a, 150b, and (iv) scheduler occupancy information, etc.

Different aspects of the mapping according to which the multi-user transmission configuration is selected will now be disclosed. These aspects also provide different alternatives of how the mapper module 245 might be implemented. In some aspects, the multi-user transmission configuration is selected according to optimization criterion. Particularly, in some embodiments, the mapping is configured according to an optimization criterion that maximizes SINR and spectral efficiency of the UEs 150a, 150b. In some aspects, the mapping is based on prior performance observations or simulations. Particularly, in some embodiments, the mapping is determined from at least one of: prior performance observations of the network node 200, simulation of operating the network node 200.

In some aspects, the mapping is implemented using a look-up table (LUT) that specifies candidate multi-user transmission configurations for different network and UE scenario characteristics, e.g., mobility status. Configuration parameters, e.g., the number of co-scheduled UEs 150a, 150b, may also be specified. Particularly, in some embodiments, the mapping is provided as a LUT, where each entry in the look-up table specifies one of the candidate multi-user transmission configurations in terms of a combination of at least of one digital precoding mode and one analog beam steering mode.

To provide service to multiple UEs 150a, 150b, they need to be scheduled by the network node 200, and an optimal scheduler needs to adapt to mmW propagation conditions, dynamically, especially when considering features of spatial consistency. In some aspects, the multi-user transmission configurations therefore also consider different scheduling modes. Particularly, in some embodiments, each of the candidate multi-user transmission configuration further specifies a scheduling mode selected from candidate scheduling modes. Parameters defining each of the candidate scheduling modes can be provided at the network node 200 in a candidate scheduling modes module 265. In some non-limiting examples, each of the candidate scheduling modes pertains to scheduling using a respective one of: round-robin scheduling (RRS), proportional fair scheduler (PFS), maximum SINR scheduling. The maximum SINR scheduling prioritizes the UEs with the best channel quality, thus punishing the radio cell-edge UEs. On the other hand, the RRS scheduling selects and schedules UEs in a round-robin manner, thereby creating an equal resource share regardless of the propagation channel conditions. The PFS scheduling provides a balance between the maximum SINR scheduling and the RRS by considering a fairness criterion, whilst providing a best effort to maximize the SINR of the UEs (and thus throughput). In some examples, when the link SNR is favorable (high), and when the UEs 150a, 150b are relatively far apart, maximum SINR scheduling will optimize the spectral efficiency for each UEs 150a, 150b due to the interference nulling as well as optimized analog beam weight computations. In the case where the UEs 150a, 150b are closely located, with high link SNR, PFS is preferable since the high inter-UE channel correlation will lead to high interference levels which are degrading the achievable performance. Under such a scenario, PFS will lead to an extensive improvement in the performance. When the link SNR is low, and the UEs 150a, 150b are far apart, the relative difference in PFS and RRS is minimized and hence both will lead to similar performance. When the UEs 150*a*, 150*b* are closely located, PFS might be preferred. For different mobility speeds, different scheduler modes can be used, whilst also considering factors such as the predominant spacing of the UEs 150*a*, 150*b*, link conditions, network load, etc.). PF can be used to strike a balance between service for each UEs 150*a*, 150*b* and network performance optimization. For low mobility UEs 150*a*, 150*b*, it might become more important to optimize for performance due to higher levels of correlation in the physical radio propagation channel, introduced by spatial consistency, and thus PF might be selected as scheduling mode. For high-speed UEs 150*a*, 150*b*, scheduling in terms of maximum SINR, or PF tuned more towards SINR maximization, can also be used since all UEs 150*a*, 150*b* are likely to experience good link conditions over time.

Selecting the scheduling mode, as part of selecting the multi-user transmission configuration, might be performed less frequently in time than selecting the digital precoding mode and selecting the analog beam steering mode. In this respect, the scheduling mode might not be changed on a per-slot basis, but over medium-term (such as physical time change corresponding to multiple minutes) UE population property variations, which include mobility, density, separation, etc.

In some aspects, the multi-user transmission configurations also consider different multi-user grouping modes. Particularly, in some embodiments, each of the candidate multi-user transmission configuration further specifies a multi-user grouping mode selected from candidate multi-user grouping modes. Parameters defining each of the candidate multi-user grouping modes can be provided at the network node 200 in a candidate grouping modes module 270. In some non-limiting examples, each of the candidate multi-user grouping modes pertains to multi-user grouping of the UEs 150*a*, 150*b* in terms of at least one of: criterion for how many of the UEs 150*a*, 150*b* to be co-scheduled, criterion for which of the UEs 150*a*, 150*b* to be co-scheduled. In further detail, the network node 200 may also adapt the user grouping strategy, i.e. selection of co-scheduled MU-MIMO users, depending on factors such as mobility of the UEs 150*a*, 150*b*, separation of the UEs 150*a*, 150*b*, network load, etc. Aspects that may be adapted according to the different multi-user grouping modes are the selection pattern (e.g. such that arbitrary UE 150*a*, 150 are selected if the minimum, or typical, separation is wide, whereas sufficiently separated subsets of UEs 150*a*, 150*b* are selected if the UEs 150*a*, 150*b* are closely-spaced in different clusters), the number of co-scheduled UEs 150*a*, 150*b* (such that more UEs 150*a*, 150*b* are selected if the network load is high and/or the mobility of the UEs 150*a*, 150*b* is low and high number of layers is expected to be supported consistently), etc. The network node 200 may also apply grouping criteria to co-schedule UEs 150*a*, 150*b* with similar mobility properties, similar SINR, etc. in some conditions and not apply such constraints in other conditions.

Aspects of the digital precoding modes will now be disclosed. In some embodiments, each of the candidate digital precoding modes involves controlling an overall radiation pattern defining beamforming lobes in which the MU-MIMO signals are transmitted towards the UEs 150*a*, 150*b* by using digital signal processing to apply mode-dependent weights to the MU-MIMO signals from different baseband ports. In accordance with the above non-limiting examples, the candidate digital precoding modes might differ from each other in terms of signal power levels in direction towards the UEs 150*a*, 150*b*, overall signal power distribution within geographical vicinity of the UEs 150*a*, 150*b*, suppression or nulling of interference in direction towards the UEs 150*a*, 150*b*, and suppression or nulling of interference within geographical vicinity of the UEs 150*a*, 150*b*. In accordance with the above non-limiting examples, each of the candidate digital precoding modes might pertain to digital precoding using a respective one of: matched filter digital precoding, zero-forcing digital precoding, regularized zero-forcing digital precoding, signal-to-leakage-plus-noise ratio digital precoding.

Aspects of the analog beam steering modes will ow be disclosed. In some embodiments, each of the candidate analog beam steering modes involves controlling directionality of the MU-MIMO signals by, at radio frequency front-end circuits, applying mode-dependent phase shifts to groups of antenna elements constituting a baseband port. In accordance with the above non-limiting examples, the candidate analog beam steering modes might differ from each other in terms of signal power levels in direction towards the UEs 150*a*, 150*b*, overall signal power distribution within geographical vicinity of the UEs 150*a*, 150*b*. In accordance with the above non-limiting examples, each of the candidate analog beam steering modes might pertain to analog beam steering using a respective one of: random angle analog beam steering, selection combining analog beam steering, aggregate composite channel phase extraction analog beam steering.

Hence, some examples of candidate beamforming methods include MF, ZF, RZF, and SLNR as different examples of digital precoding modes in the digital signal processing domain and RA, SC and AC-CPE as different examples of analog beam steering modes in the analog signal processing domain, respectively.

In some aspects, which multi-user transmission configuration mode to select is based on a comparison between obtained parameters and one or more thresholds. Particularly, in some embodiments, according to the mapping, the multi-user transmission configuration is selected from the candidate multi-user transmission configurations based on a comparison between the parameter values and a set of threshold values, one for each type of parameter value. Examples of threshold values will be provided below.

In some examples, for high mobility of the UEs 150*a*, 150*b*, the multi-user transmission configuration mode is selected for signal power maximization in the direction of the desired UEs 150*a*, 150*b* e.g. using MF or RZF in combination with AC-CPE or SC. That is, in some embodiments, one type of parameter value is a mobility type of parameter value, and, when the mobility of each of the UEs 150*a*, 150*b* is above the threshold value for the mobility type of parameter value, the multi-user transmission configuration is according to the mapping selected to maximize signal power in direction towards the UEs 150*a*, 150*b*.

In some examples, for high mobility of the UEs 150*a*, 150*b* the multi-user transmission configuration mode can be selected for balance between desired power maximization and interference suppression e.g. using ZF, RZF or SLNR in combination with AC-CPE. That is, in some embodiments, one type of parameter value is a mobility type of parameter value, and, when the mobility of each of the UEs 150*a*, 150*b* is below the threshold value for the mobility type of parameter value, the multi-user transmission configuration is according to the mapping selected to balance maximization of signal power in direction towards the UEs 150*a*, 150*b* and interference suppression.

In some examples, the network node 200 applies a multi-user transmission configuration defined by using MF as digital precoding mode and SC as analog beam steering mode if the mobility status for a first number, or fraction, of UEs 150a, 150b is high, where the certain number may be an absolute number threshold, relative fraction threshold, or any such UEs 150a, 150b being present. This multi-user transmission configuration is selected, since with high mobility, the physical radio propagation channel will be expected to decorrelate at a much more rapid rate (both for desired and/or interfering UEs 150a, 150b), allowing for an opportunity for desired signal power maximization, whilst the mobility provides some implicit interference reduction due to the high likelihood of widely separated channels. The choice of analog beam steering mode will also be reliant on identifying and adjusting the analog beamforming matrix such that it considers transmission in the direction of the strongest path towards the desired UEs 150a, 150b, where the analog beam gain can be steered. This would yield the most superior performance achievable by hybrid beamforming.

Conversely, in some examples the network node 200 applies a multi-user transmission configuration defined by using RZF as digital precoding mode and AC-CPE as analog beam steering mode if the mobility status for a second predetermined number, or fraction of, UEs 150a, 150b is low. This since low mobility is likely to result in moderate channel correlation levels for desired and interfering UEs 150a, 150b due to channels being spatially consistent. This calls for a more even balance between interference nulling and desired signal maximization by the selection of RZF as digital precoding mode and AC-CPE as analog beam steering mode, providing the analog beams using the acquired radio channel phases. Due to low mobility of the UEs 150a, 150b, these radio channel phases can be estimated with a high accuracy to assist the analog beamformer.

Whilst AC-CPE is a generally well performing, having the potential to be used for a wide range of scenarios, one scenario it may not perform optimally in is described as follows. When the mobility status of multiple UEs 150a, 150b (desired and/or interfering) is high (e.g., with a millisecond coherence time), analog beam steering in terms of SC will yield better performance than AC-CPE. In this case, to maximize the spectral efficiency to each UEs 150a, 150b, a multi-user transmission configuration defined by using MF as digital precoding mode and SC as analog beam steering mode. This since with high mobility, the physical radio propagation channels implicitly decorrelate at a much more rapid rate for desired and/or interfering UEs 150a, 150b, allowing for an opportunity to focus on desired signal power maximization only. This since the mobility already provides implicit interference reduction mechanism due to the high likelihood of widely separated channels over a very short temporal duration. This would maximize signal power in two stages; first with MF digital beamforming, followed by SC analog beamforming.

In some aspects, the multi-user transmission configuration is selected with an objective to maximize the SINR and spectral efficiency of the UEs 150a, 150b with the cost trade-off for the current scenario. One consideration is the spatial distribution, and in particular the spatial separation of the UEs 150a, 150b. Although advanced methods allow null-steering for interference control, the effectiveness of null-steering degrades as the co-scheduled UEs 150a, 150b are closer to each other in the beam/angular space. Therefore, for closely spaced UEs 150a, 150b, a simpler beamforming alternative which focuses on desired signal power maximization will provide nearly as good performance and is preferable due to lower processing complexity.

In some examples, a spatial separation metric, S, is defined to quantify the separation between the UEs 150a, 150b. The spatial separation metric could be e.g. the mean or pre-determined percentile of the distribution of differences in the dominant angle of arrival (AOA) of signals of UEs 150a, 150b that are adjacent in azimuth and/or elevation. The selection of digital precoding mode may be based on such a metric, by comparing it to a threshold T. In some examples, if S<T, then MF digital precoding is applied, otherwise digital precoding in terms of ZF, RZF, or SLNR is used, whilst analog beam steering in terms of either SC or AC-CPE is used. The threshold, or the preference for selecting which digital precoding mode to use may depend on multiple additional factors, such as the UEs 150a, 150b mobility patterns determining the second-order variations in the propagation channels across multiple UEs 150a, 150b.

In mmW systems, an AOA-based spatial separation criterion is advantageously used to account for steering accuracy and separation limits posed by e.g. main lobe width and channel estimation inaccuracy. Common mmWave channels are dominated by specular reflections and line of sight (LOS) propagation. For the vast majority of the measured mmW physical radio propagation channels, sparsity in the number of available multipath components is a key observable property, where only a finite number of dominant components are visible to the UEs 150a, 150b and/or the network node 200. The mechanisms of diffuse scattering and diffraction leading to denser multipath environments are generally not prominent at mmWave frequencies. In any case, for dispersive physical radio propagation channels, the separation does not necessarily have a geometrical meaning, yet can be quantified e.g. in terms of channel correlation over the ensemble of small-scale fading mechanisms. Nevertheless, for the vast majority of the measured physical radio propagation channels, sparsity in the number of available multipath components is a key observable property, where only a finite number of dominant components are visible to the UEs 150a, 150b and/or the network node 200. The spatial separation threshold, T, for selecting which digital precoding mode to use may additionally be based on the antenna array size and the resulting beam resolution. A larger array can handle UEs 150a, 150b with closer separation (T can be lowered). It may also depend on the number of co-scheduled UEs 150a, 150b to serve the offered network load. The minimum separation, T, is lower if a low number of users is co-scheduled.

Figure 5:
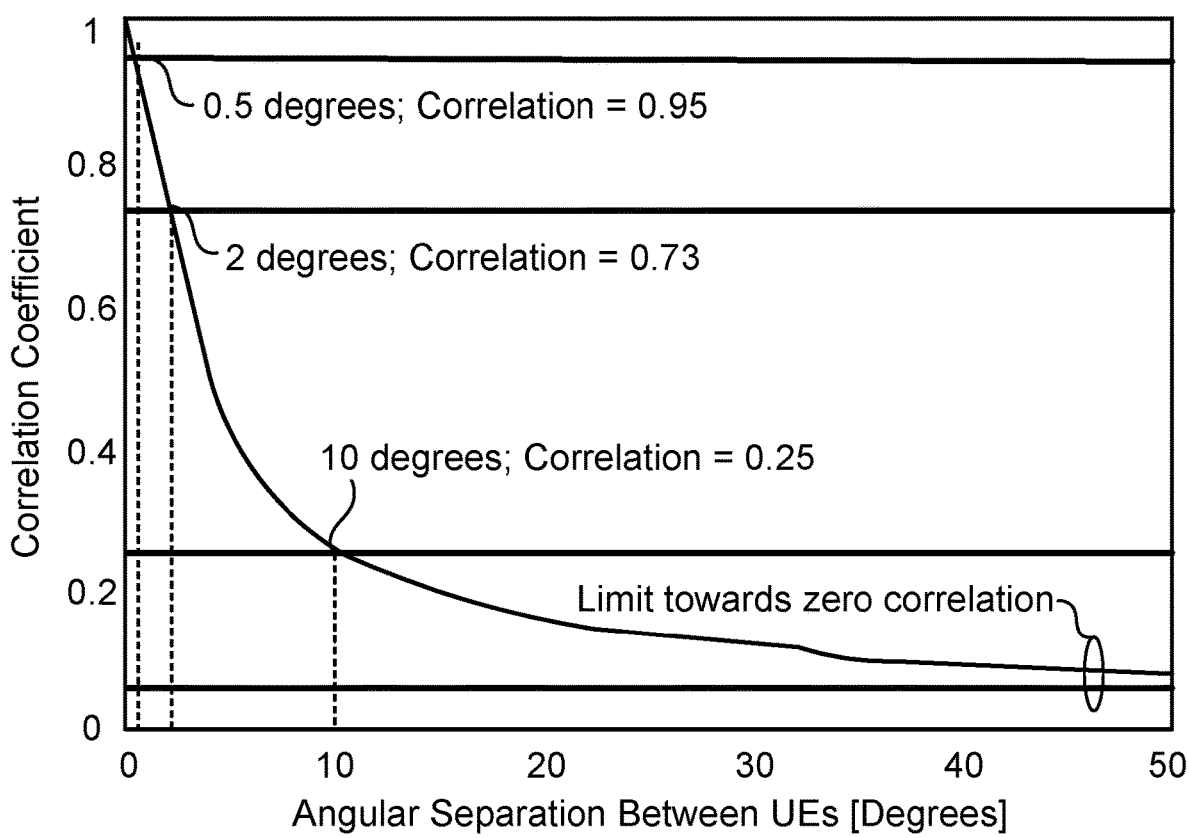
FIG. 5 schematically illustrates correlation as a function of angular separation between UEs according to embodiments.

In FIG. 5 is illustrated inter-UE correlation coefficient as a function of the angular separation between two UEs 150a, 150b. It can be observed that there is a moderate level of correlation when the UEs 150a, 150b are separated in the azimuth by 10°. The limit to zero correlation is more than 50° due to spatial consistency adding to the level of overall correlation coefficient. FIG. 5 shows results for a TRP 140 equipped with an antenna array having 256 elements in a dual-polarized uniform planar array of 16-by-16 elements configuration. When the two UEs 150a, 150b are relatively closely spaced, i.e., 2° angular separation, irrespective of the sector distance, the inter-UE correlation is 0.73. The inter-UE correlation drops to 0.25 when the UEs 150a, 150b are 10° apart, whilst the limit towards zero correlation is in excess of 50°, due to some of the spatially consistent multipath components staying with both UEs 150a, 150b even after 50° relative spatial separation in azimuth. This has an impact on spectral efficiency performance aspects of the herein disclosed embodiments.

The threshold T may also depend on the achievable channel estimation quality. As a rule, interference suppression schemes require high-quality channel estimates to accurately steer the nulls. Channel estimation quality in poor link conditions may be improved by allocating additional training resources, but that occurs at the cost of reduced SE since data resources are reduced. The threshold T may thus be higher for low link quality for the co-scheduled UEs 150a, 150b.

The threshold T may also depend on user movement speed/mobility. To maintain up-to-date channel state information (CSI), channel estimation needs to be updated at the rate of channel coherence time. For UEs 150a, 150b with high mobility/Doppler, this means that data spectral efficiency will be degraded due to resource allocation for channel estimation/training. The threshold T may thus be higher for higher-Doppler user population or co-scheduled set of UEs 150a, 150b.

The threshold T may also depend on the number of UEs 150a, 150b to handle. For a larger number of co-scheduled UEs 150a, 150b, the complexity of the multi-user transmission is higher and the threshold T may thus be higher to ensure sufficient performance improvement.

In general terms, when UE mobility is high, the focus of analog beam steering and digital precoding is towards signal power maximization in the direction of the desired (scheduled) UEs 150a, 150b. In such scenarios, interference suppression is not preferred since the high mobility decorrelates the desired UE channels as well as interference UE channels. Because of this reason, a multi-user transmission configuration defined by using SC as analog beam steering mode and using MF as digital precoding mode can be selected. No change would be made if the UEs 150a, 150b are closely separated with respect to each other whilst having high mobility.

For lower mobility of UEs 150a, 150b, the desired and interfering radio channels contain a significant amount of spatial correlation due to their spatially consistent nature. Here, striking a balance between desired power maximization and interference suppression utilizing both analog and digital signal processing domains become more important to optimize performance, and as a result, a multi-user transmission configuration defined by using AC-CPE as analog beam steering mode and RZF as digital precoding mode can be selected. No change to this would be made if the UEs 150a, 150b are spatially far away from each other.

If the link SNR is high, this implies that the network is operated in an interference-limited regime, where the focus of the network node 200 is on interference suppression. Hence a multi-user transmission configuration defined by using SC as analog beam steering mode and using RZF as digital precoding mode can be selected, whilst if the link SNR is low, implying operation of the system in the noise-limited region, power maximization is prioritized, and hence a multi-user transmission configuration defined by using AC-CPE as analog beam steering mode and using MF as digital precoding mode can be selected.

If the network load is high, so long as interference suppression can be performed in the digital signal processing domain using RZF as digital precoding mode, analog beam steering mode by using RA would yield similar performance relative to other analog beam steering modes. In contrast, if the network load is low, interference suppression still remains the criteria to be optimized for performance optimality, and hence RZF is retained as a digital precoding mode.

Aspects of the multi-user transmission configuration in terms of estimation of per-UE spectral efficiency will be disclosed next. For efficient scheduling, to balance latency and risk for network saturation, the scheduler requires an estimate of current system capacity. In some examples the network node 200 obtains a cell capacity estimate for a cell in which hybrid beamforming is applied by (i): estimating the unconstrained UE spectral efficiency and/or cell throughput, (ii): estimating the spectral efficiency loss due to the used hybrid beamforming (i.e., the selected multi-user transmission configuration), and (iii) adjusting the unconstrained spectral efficiency estimate using the loss estimate.

Estimating the unconstrained UE spectral efficiency and/or cell throughput may be performed using known techniques, e.g. Shannon capacity-like expressions. Foe estimating the spectral efficiency loss due to the used hybrid beamforming, utilizing tools from multivariate statistics and Shannon theory, a spectral efficiency expression for a given digital precoding mode (any one of MF, ZF, RZF or SLNR) can be derived. Then, with hybrid beamforming, for a given type of digital precoding, and analog beam steering mode (any one of SC, AC-CPE or RA), another expression is derived for the spectral efficiency. Followed by this, a difference between the resulting spectral efficiency from fully digital precoding and hybrid beamforming is computed and analyzed for any given combination of analog beam steering and digital precoding. This difference in spectral efficiency is then used to characterize loss imposed by hybrid beamforming (any combination) relative to fully digital beamforming. The adjusted estimate can be used to derive per-UE or sum spectral efficiency limits more dynamically, achieving scheduler optimization on medium-term time horizon. The obtained spectral efficiency estimate can then be used by the scheduler to ensure that the scheduled load remains at a robust percentage of the achievable spectral efficiency, e.g., not exceeding 70-80%.

Figure 6:
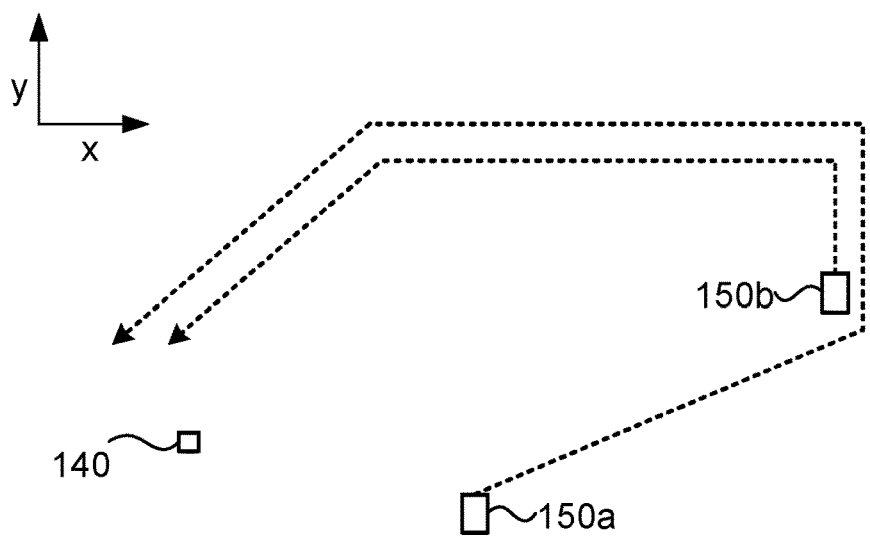
FIG. 6 schematically illustrates a first mobility scenario according to embodiments.
Figure 7:
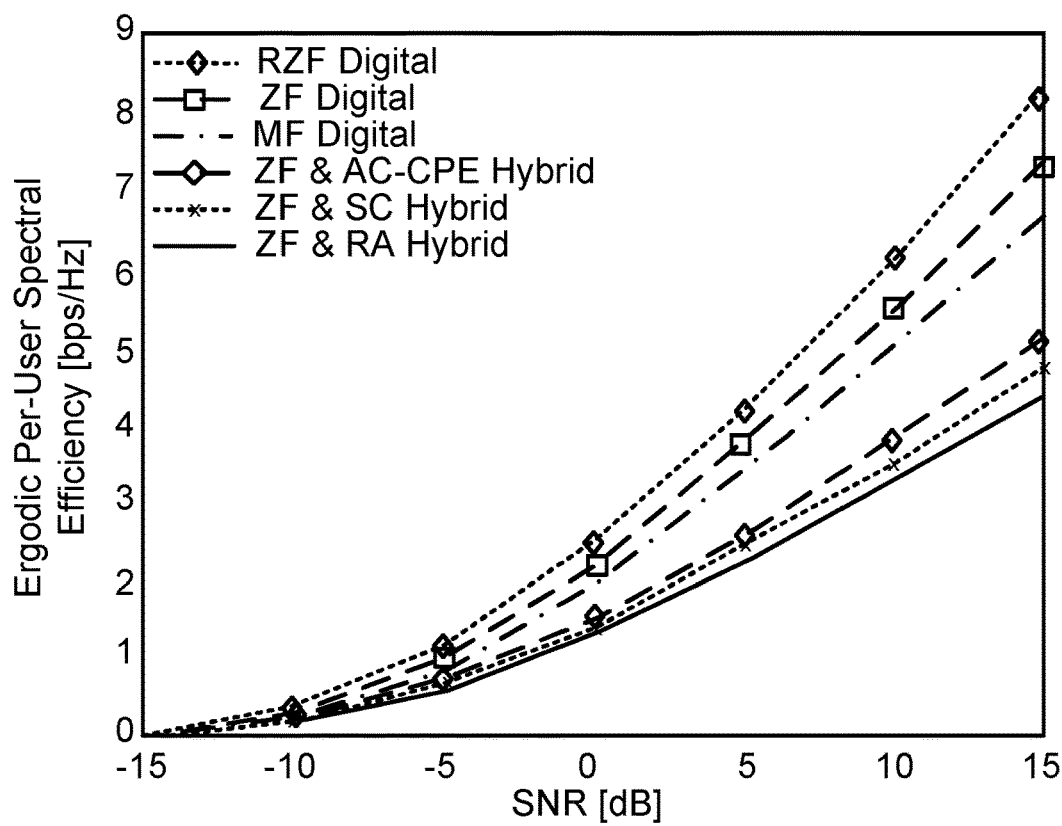
FIG. 7 schematically illustrates simulation results of the first mobility scenario according to embodiments.

FIG. 6 schematically illustrates a first mobility scenario where two UEs 150a, 150b are moving along their individual trajectories in the horizontal xy-plane as illustrated by respective arrowed lines, and are served by the network node 200 (as represented by its TRP 140) equipped with a hybrid beamformer. The 3GPP TR 38.901 NLOS UMi propagation model is used for computing the propagation channel impulse responses from the TRP 140 to UE 150a and UE 150b, respectively. The movement velocities of both UEs 150a, 150b is fixed to 0.83 m/s and the moving interval per realization of the channel is fixed to 0.1 m of distance. This is in line with 3GPP TR 38.901 NLOS UMi recommendations. FIG. 7 shows the ergodic per-UE spectral efficiency for the scenario described in FIG. 6 for different multi-user transmission configurations as well as for pure digital beamforming. The most optimal spectral efficiency achievable is with the combination of ZF with AC-CPE, which at low SNRs converge to relatively minor performance difference and at high SNR leads to larger variations in comparison to the fully digital beamforming mechanisms. The most superior digital beamforming technique is RZF which takes substantial computation resources relatively to the low-complexity alternative of hybrid ZF with AC-CPE. The presented results in FIG. 7 demonstrate gains which are based on per-UE on average. This would mean that the overall gain across L number of UEs 150a, 150b in the system would be on average L times than that shown in FIG. 7. Furthermore, the depicted gains are shown per 1 Hz of bandwidth, hence the units bits/second/Hz. This would naturally be multiplied with the bandwidth on offer to yield rates characterized in bits/second.

Figure 8:
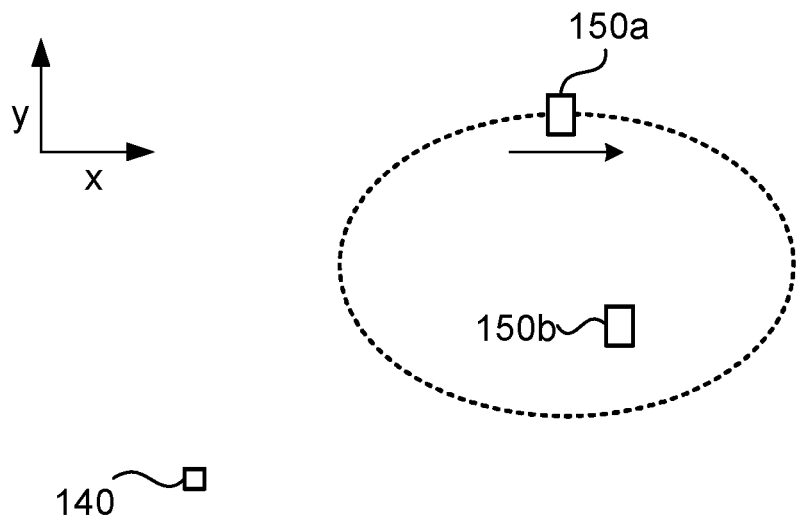
FIG. 8 schematically illustrates a second mobility scenario according to embodiments.
Figure 9:
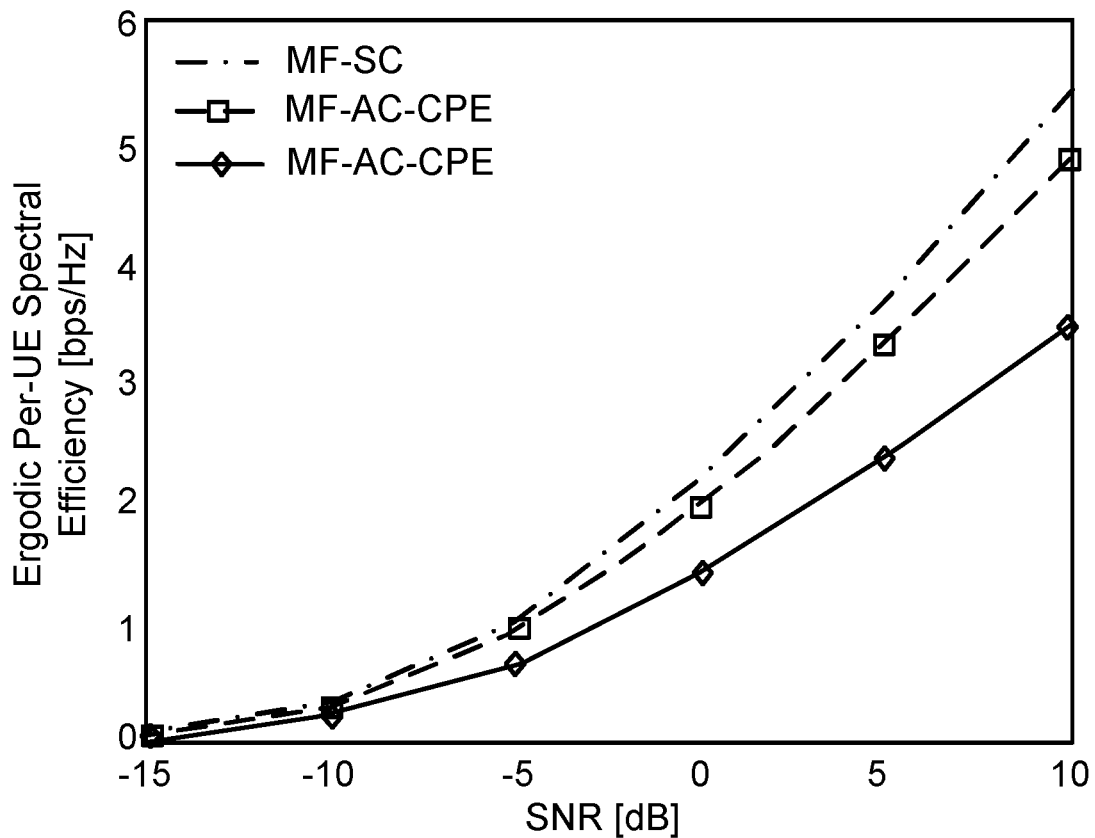
FIG. 9 schematically illustrates simulation results of the second mobility scenario according to embodiments.

FIG. 8 schematically illustrates a second mobility scenario where two UEs 150a, 150b are served by the network node 200 (as represented by its TRP 140) equipped with a hybrid beamformer. The mobility in the second mobility scenario is higher than in the first mobility scenario. UE 150a is moving at 10 m/s (36 km/h) in the horizontal xy-plane, while UE 150b is stationary in the horizontal xy-plane. The overall trajectory of UE 150a 1 is indicated with a dotted line. UE 150a follows its trajectory in the clockwise direction indicated by the arrow. All the remaining parameters of the system are the same as those used for FIG. 6. FIG. 9 shows the ergodic per-UE spectral efficiency for the scenario described in FIG. 8 for different multi-user transmission configurations with MF digital precoding. As can be seen in FIG. 9, particularly for moderate and larger SNRs, SC outperforms AC-CPE in terms of analog beam steering method.

In summary, the herein disclosed embodiments enable a suitable hybrid beamforming mode to be selected based on statistics of co-scheduled UEs 150a, 150b, as well as other optional factors, parameters, or conditions. The selection of digital precoding mode can be made independently from the selection of analog beam steering mode and a combination of digital precoding mode and analog beam steering mode can be selected for maximizing desired signal power and/or minimizing multiuser interference. The specific combination digital precoding mode and analog beam steering mode can be selected such that the maximization of the relevant quantity is ensured across all UE conditions (high and low mobility, high and low UEs 150a, 150b density, closely separated and far apart UEs 150a, 150b, etc.). For closely-spaced UEs 150a, 150b, MF or RZF in combination with AC-CPE or SC can be be applied such that the received power is maximized in both the analog signal processing domain and the digital signal processing domain, while for spatially separated UEs 150a, 150b, ZF, RZF or SLNR in combination with AC-CPE can be selected to provide optimal spectral efficiency as a result of providing effective interference suppression. A suitable scheduling mode (in terms of selection between RRS, PFS, or maximum SINR scheduling) and/or MU-MIMO user grouping mode (in terms of number of simultaneously co-scheduled UEs 150a, 150b, UEs 150a, 150b selection criteria) can be be selected based on the feasible number of MU-MIMO layers, UE positions and/or distribution, mobility and/or predictability, etc. A summary of how the multi-user transmission configuration, in terms of hybrid beamforming mode, scheduling mode, and multi-user grouping mode, can be selected as a function of spatial separation of UEs, UE mobilities, UE link quality and network load according to the herein disclosed embodiments, aspects, and examples is provided in Table 1.

TABLE 1

Summary of hybrid beamforming mode, scheduling mode, and multi-user grouping mode as a function of spatial separation of UEs, UE mobilities, UE link quality and network load.

| System operation parameter | Selected hybrid beamforming mode | Selected scheduling mode | Selected multi-user grouping mode |
|---|---|---|---|
| Spatial separation of UEs | | | |
| Close | Analog beam steering mode: SC<br>Digital precoding mode(s): MF (or RZF) | PF | Maximize angular distance |
| Well separated | Analog beam steering mode: AC-CPE<br>Digital precoding mode: RZF (ZF, or SLNR) | RR (or PF) | Arbitrary |
| UE mobility | | | |
| High | Analog beam steering mode: SC<br>Digital precoding mode: MF | PF | Similar speeds |
| Low | Analog beam steering mode: AC-CPE<br>Digital precoding mode: RZF (or MF) | PF | Arbitrary |
| UE link quality (and related channel estimation quality) | | | |
| High | Analog beam steering mode: SC<br>Digital precoding mode: RZF (or ZF, SLNR) | PF (or Max SINR) | Similar SINR |
| Low | Analog beam steering mode: AC-CPE<br>Digital precoding mode: MF (or RZF) | RR | Similar SINR |
| Network load | | | |
| High | Analog beam steering mode: RA<br>Digital precoding mode: RZF | PF | Larger groups |
| Low | Analog beam steering mode: AC-CPE<br>Digital precoding mode: RZF (or ZF, SLNR) | RR | Smaller groups |

Figure 10:
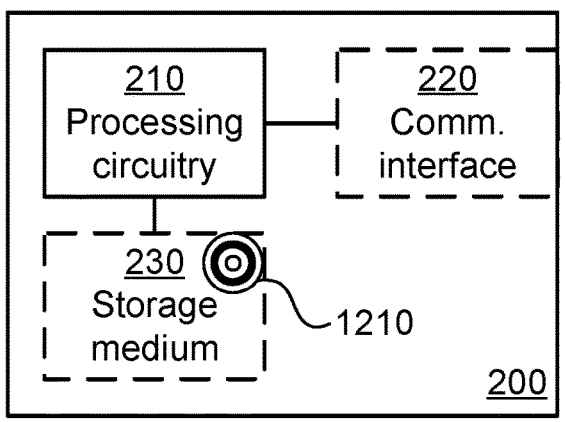
FIG. 10 is a schematic diagram showing functional units of a network node according to an embodiment.

FIG. 10 schematically illustrates, in terms of a number of functional units, the components of a network node 200 according to an embodiment. Processing circuitry 210 is provided using any combination of one or more of a suitable central processing unit (CPU), multiprocessor, microcontroller, digital signal processor (DSP), etc., capable of executing software instructions stored in a computer program product 1210 (as in FIG. 12), e.g. in the form of a storage medium 230. The processing circuitry 210 may further be provided as at least one application specific integrated circuit (ASIC), or field programmable gate array (FPGA).

Particularly, the processing circuitry 210 is configured to cause the network node 200 to perform a set of operations, or steps, as disclosed above. For example, the storage medium 230 may store the set of operations, and the processing circuitry 210 may be configured to retrieve the set of operations from the storage medium 230 to cause the network node 200 to perform the set of operations. The set of operations may be provided as a set of executable instructions.

Thus the processing circuitry 210 is thereby arranged to execute methods as herein disclosed. The storage medium 230 may also comprise persistent storage, which, for example, can be any single one or combination of magnetic memory, optical memory, solid state memory or even remotely mounted memory. The network node 200 may further comprise a communications interface 220 at least configured for communications with other entities, functions, nodes, and devices, of the communication network 100 as well as entities, functions, nodes, and devices served by the communication network 100, such as the user equipment 150a: 150d. As such the communications interface 220 may comprise one or more transmitters and receivers, comprising analogue and digital components. The processing circuitry 210 controls the general operation of the network node 200 e.g. by sending data and control signals to the communications interface 220 and the storage medium 230, by receiving data and reports from the communications interface 220, and by retrieving data and instructions from the storage medium 230. Other components, as well as the related functionality, of the network node 200 are omitted in order not to obscure the concepts presented herein.

Figure 11:
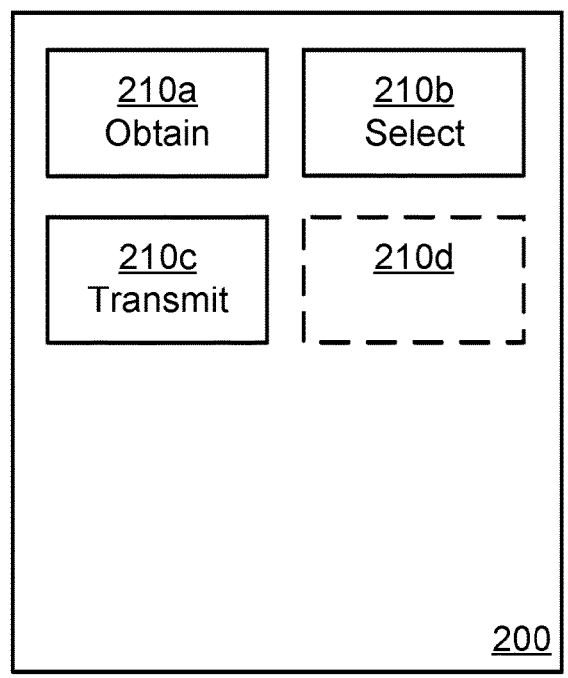
FIG. 11 is a schematic diagram showing functional modules of a network node according to an embodiment.

FIG. 11 schematically illustrates, in terms of a number of functional modules, the components of a network node 200 according to an embodiment. The network node 200 of FIG. 11 comprises a number of functional modules; an obtain module 210a configured to perform step S102, a select module 210b configured to perform step S104, and a transmit module 210c configured to perform step S106. The network node 200 of FIG. 11 may further comprise a number of optional functional modules, as represented by functional module 210d configured to perform any further step encompassed by the herein disclosed embodiments. In general terms, each functional module 210a:210d may in one embodiment be implemented only in hardware and in another embodiment with the help of software, i.e., the latter embodiment having computer program instructions stored on the storage medium 230 which when run on the processing circuitry makes the network node 200 perform the corresponding steps mentioned above in conjunction with FIG. 11. It should also be mentioned that even though the modules correspond to parts of a computer program, they do not need to be separate modules therein, but the way in which they are implemented in software is dependent on the programming language used. Preferably, one or more or all functional modules 210a:210d may be implemented by the processing circuitry 210, possibly in cooperation with the communications interface 220 and/or the storage medium 230. The processing circuitry 210 may thus be configured to from the storage medium 230 fetch instructions as provided by a functional module 210a:210d and to execute these instructions, thereby performing any steps as disclosed herein.

The network node 200 may be provided as a standalone device or as a part of at least one further device. For example, the network node 200 may be provided in a node of the radio access network or in a node of the core network. Alternatively, functionality of the network node 200 may be distributed between at least two devices, or nodes. These at least two nodes, or devices, may either be part of the same network part (such as the radio access network or the core network) or may be spread between at least two such network parts. In general terms, instructions that are required to be performed in real time may be performed in a device, or node, operatively closer to the cell than instructions that are not required to be performed in real time.

Thus, a first portion of the instructions performed by the network node 200 may be executed in a first device, and a second portion of the of the instructions performed by the network node 200 may be executed in a second device; the herein disclosed embodiments are not limited to any particular number of devices on which the instructions performed by the network node 200 may be executed. Hence, the methods according to the herein disclosed embodiments are suitable to be performed by a network node 200 residing in a cloud computational environment. Therefore, although a single processing circuitry 210 is illustrated in FIG. 10 the processing circuitry 210 may be distributed among a plurality of devices, or nodes. The same applies to the functional modules 210a:210d of FIG. 11 and the computer program 1220 of FIG. 12.

Figure 12:
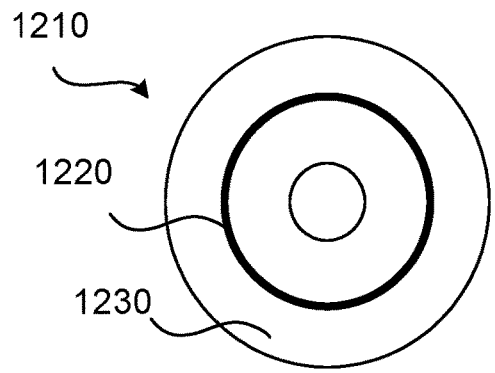
FIG. 12 shows one example of a computer program product comprising computer readable storage medium according to an embodiment.

FIG. 12 shows one example of a computer program product 1210 comprising computer readable storage medium 1230. On this computer readable storage medium 1230, a computer program 1220 can be stored, which computer program 1220 can cause the processing circuitry 210 and thereto operatively coupled entities and devices, such as the communications interface 220 and the storage medium 230, to execute methods according to embodiments described herein. The computer program 1220 and/or computer program product 1210 may thus provide means for performing any steps as herein disclosed.

In the example of FIG. 12, the computer program product 1210 is illustrated as an optical disc, such as a CD (compact disc) or a DVD (digital versatile disc) or a Blu-Ray disc. The computer program product 1210 could also be embodied as a memory, such as a random access memory (RAM), a read-only memory (ROM), an erasable programmable read-only memory (EPROM), or an electrically erasable programmable read-only memory (EEPROM) and more particularly as a non-volatile storage medium of a device in an external memory such as a USB (Universal Serial Bus) memory or a Flash memory, such as a compact Flash memory. Thus, while the computer program 1220 is here schematically shown as a track on the depicted optical disk, the computer program 1220 can be stored in any way which is suitable for the computer program product 1210.

The inventive concept has mainly been described above with reference to a few embodiments. However, as is readily appreciated by a person skilled in the art, other embodiments than the ones disclosed above are equally possible within the scope of the inventive concept, as defined by the appended patent claims.

The invention claimed is:

1. A network node for transmission of multi-user multiple input multiple output, MU-MIMO, signals, the network node comprising processing circuitry, the processing circuitry being configured to cause the network node to:
    obtain parameter values of statistics of co-scheduled user equipment served by the network node, the statistics at least pertaining to mobility of each of the user equipment;
    dynamically select a multi-user transmission configuration from candidate multi-user transmission configurations, where each candidate multi-user transmission configuration specifies at least a digital precoding mode selected from candidate digital precoding modes and an analog beam steering mode selected from candidate analog beam steering modes, the multi-user transmission configuration being selected according to the parameter values and a configured mapping of the parameter values to the candidate multi-user transmission configurations; and
    transmit the MU-MIMO signals towards the user equipment using the selected multi-user transmission configuration.

2. The network node according to claim 1, where each of the candidate multi-user transmission configuration further specifies a scheduling mode selected from candidate scheduling modes.

3. The network node according to claim 2, wherein each of the candidate scheduling modes pertains to scheduling using a respective one of:
    round-robin scheduling, proportional fair scheduler, and maximum signal-to-noise-plus-interference ratio scheduling.

4. The network node according to claim 2, wherein selecting the scheduling mode as part of selecting the multi-user transmission configuration is performed less frequently in time than selecting the digital precoding mode and selecting the analog beam steering mode.

5. The network node according to claim 1, wherein each of the candidate multi-user transmission configuration further specifies a multi-user grouping mode selected from candidate multi-user grouping modes.

6. The network node according to claim 5, wherein each of the candidate multi-user grouping modes pertains to multi-user grouping of the user equipment in terms of at least one of:
    criterion for how many of the user equipment to be co-scheduled, and criterion for which of the user equipment to be co-scheduled.

7. The network node according to claim 1, wherein the mobility of the user equipment is defined by respective user equipment movement trajectories and mobility status of the user equipment.

8. The network node according to claim 1, wherein the statistics further pertain to at least one of:
    spatial separation between the user equipment, and link quality for each of the user equipment.

9. The network node according to claim 1, wherein the parameter values also are of network operation parameters.

10. The network node according to claim 9, wherein the network operation parameters pertain at least to one of:
    current traffic load of the network node, and currently usable number of MU-MIMO layers at the network node.

11. The network node according to claim 1, wherein the mapping is determined from at least one of:
    prior performance observations of the network node, and simulation of operating the network node.

12. The network node according to claim 1, wherein the mapping is provided as a look-up table, where each entry in the look-up table specifies one of the candidate multi-user transmission configurations in terms of a combination of at least of one digital precoding mode and one analog beam steering mode.

13. The network node according to claim 1, wherein, according to the mapping, the multi-user transmission configuration is selected from the candidate multi-user transmission configurations based on a comparison between the parameter values and a set of threshold values, one for each type of parameter value; and
    wherein one type of parameter value is a mobility type of parameter value, and wherein, when the mobility of each of the user equipment is above the threshold value for the mobility type of parameter value, the multi-user transmission configuration is according to the mapping selected to maximize signal power in direction towards the user equipment; and
    wherein, when the mobility of each of the user equipment is below the threshold value for the mobility type of parameter value, the multi-user transmission configuration is according to the mapping selected to balance maximization of signal power in direction towards the user equipment and interference suppression.

14. The network node according to claim 1, wherein each of the candidate digital precoding modes involves controlling an overall radiation pattern defining beamforming lobes in which the MU-MIMO signals are transmitted towards the user equipment by using digital signal processing to apply mode-dependent weights to the MU-MIMO signals from different baseband ports.

15. The network node according to claim 1, wherein the candidate digital precoding modes differ from each other in terms of signal power levels in direction towards the user equipment, overall signal power distribution within geographical vicinity of the user equipment, suppression or nulling of interference in direction towards the user equipment, and suppression or nulling of interference within geographical vicinity of the user equipment.

16. The network node according to claim 1, wherein one or both:
    each of the candidate digital precoding modes pertains to digital precoding using a respective one of: matched filter digital precoding, zero-forcing digital precoding, regularized zero-forcing digital precoding, signal-to-leakage-plus-noise ratio digital precoding; and
    each of the candidate analog beam steering modes involves controlling directionality of the MU-MIMO signals by, at radio frequency front-end circuits, applying mode-dependent phase shifts to groups of antenna elements constituting a baseband port.

17. The network node according to claim 1, wherein one or both:
    the candidate analog beam steering modes differ from each other in terms of signal power levels in direction towards the user equipment, overall signal power distribution within geographical vicinity of the user equipment; and
    each of the candidate analog beam steering modes pertains to analog beam steering using a respective one of: random angle analog beam steering, selection combining analog beam steering, and aggregate composite channel phase extraction analog beam steering.

18. The network node according to claim 1, wherein the multi-user transmission configuration one or both:

defines a hybrid beamforming mode as defined by one digital precoding mode and one analog beam steering mode; and is dynamically selectable per each scheduling instance of the user equipment.

19. A method for transmission of multi-user multiple input multiple output, MU-MIMO, signals, the method being performed by a network node (200, the method comprising:

obtaining parameter values of statistics of co-scheduled user equipment served by the network node, the statistics at least pertaining to mobility of each of the user equipment;

dynamically selecting a multi-user transmission configuration from candidate multi-user transmission configurations, where each candidate multi-user transmission configuration specifies at least a digital precoding mode selected from candidate digital precoding modes and an analog beam steering mode selected from candidate analog beam steering modes, the multi-user transmission configuration being selected according to the parameter values and a configured mapping of the parameter values to the candidate multi-user transmission configurations; and transmitting the MU-MIMO signals towards the user equipment using the selected multi-user transmission configuration.

20. A non-transitory computer storage medium storing a computer program for transmission of multi-user multiple input multiple output, MU-MIMO, signals, the computer program comprising computer code which, when run on processing circuitry of a network node, causes the network node to:

obtain parameter values of statistics of co-scheduled user equipment served by the network node, the statistics at least pertaining to mobility of each of the user equipment;

dynamically select a multi-user transmission configuration from candidate multi-user transmission configurations, where each candidate multi-user transmission configuration specifies at least a digital precoding mode selected from candidate digital precoding modes and an analog beam steering mode selected from candidate analog beam steering modes, the multi-user transmission configuration being selected according to the parameter values and a configured mapping of the parameter values to the candidate multi-user transmission configurations; and transmit the MU-MIMO signals towards the user equipment using the selected multi-user transmission configuration.

* * * * *